US012616977B2

(12) United States Patent
Blessing et al.

(10) Patent No.: US 12,616,977 B2
(45) Date of Patent: May 5, 2026

(54) CONCAVE

(71) Applicant: Kleemann GmbH, Göppingen (DE)

(72) Inventors: Otto Blessing, Bartholomä (DE); Lucas Scholz, Göppingen (DE)

(73) Assignee: Kleemann GmbH, Göppingen (DE)

(*) Notice: Subject to any disclaimer, the term of this patent is extended or adjusted under 35 U.S.C. 154(b) by 353 days.

(21) Appl. No.: 18/402,799

(22) Filed: Jan. 3, 2024

(65) Prior Publication Data

US 2024/0238791 A1 Jul. 18, 2024

(30) Foreign Application Priority Data

Jan. 18, 2023 (DE) ..................... 10 2023 101 145.6

(51) Int. Cl.
*B02C 2/00* (2006.01)
*B02C 2/04* (2006.01)

(52) U.S. Cl.
CPC ................ *B02C 2/005* (2013.01); *B02C 2/04* (2013.01); *B02C 2210/02* (2013.01)

(58) Field of Classification Search
CPC .. B02C 2/02; B02C 2/04; B02C 2/005; B02C 2210/02
See application file for complete search history.

(56) References Cited

U.S. PATENT DOCUMENTS 2,628,788 A * 2/1953 Kueneman .............. B02C 2/045 241/290
3,533,569 A 10/1970 Walter, Jr.
(Continued)

FOREIGN PATENT DOCUMENTS

DE 1101111 B1 3/1961
DE 1782838 C1 * 2/1978 ............. B02C 2/005
(Continued)

OTHER PUBLICATIONS

Translation of JP-3230485.*
(Continued)

*Primary Examiner* — Bobby Yeonjin Kim
(74) *Attorney, Agent, or Firm* — Lucian Wayne Beavers; Patterson Intellectual Property Law, PC

(57) ABSTRACT

The disclosure relates to a concave (20) of a cone crusher and/or gyratory crusher for installation inside a crusher head (30), wherein the concave (20) has a central longitudinal axis (M) extending in the longitudinal direction of the concave, wherein the concave (20) has a feed (24.1) for material to be crushed on its top (O) and a crushed material discharge area (24.2) on its opposite bottom (U), and wherein the concave (20) has a base part (21) having an outer clamping surface (28). In order to reduce the amount of parts and installation work, provision is made according to the disclosure for the base part (21) to have a support section (25) having fastening lugs (26) projecting radially outwards, wherein the fastening lugs (26) are disposed spaced apart from one another in the circumferential direction of the support section (25) by means of spacer areas, wherein at least one clearance is provided in each of the spacer areas, which clearances permit a penetration in the direction of the central longitudinal axis (M) from the bottom (U) in the direction of the top (O), and wherein the radially outward extent of the clamping surface (28) is greater, at least sectionally, than the radially outward extent of the fastening lugs (26).

13 Claims, 5 Drawing Sheets

(56) References Cited

U.S. PATENT DOCUMENTS

| | | | | |
|---|---|---|---|---|
| 4,215,826 | A | 8/1980 | Schafer | |
| 9,566,585 | B2 * | 2/2017 | Van Mullem | B02C 2/005 |
| 10,391,500 | B2 | 8/2019 | Larsson et al. | |

FOREIGN PATENT DOCUMENTS

| | | | | |
|---|---|---|---|---|
| DE | 2810419 | A1 * | 9/1979 | |
| DE | 2810419 | C2 | 8/1982 | |
| EP | 2758176 | A1 | 7/2014 | |
| EP | 3317018 | B1 | 4/2019 | |
| JP | 3230485 | U * | 2/2021 | B02C 2/005 |
| WO | 2013043971 | A1 | 3/2013 | |

OTHER PUBLICATIONS

Translation of DE-2810419.*
Translation of DE-1782838.*
European Patent Office Search Report for corresponding patent application No. 23217698.2, dated Mar. 13, 2024, 7 pages (not prior art).
Office action of Nov. 14, 2023 in corresponding German application No. 10 2023 101 145.6, 10 pages (not prior art).

* cited by examiner

CONCAVE

RELATED APPLICATIONS

The present application claims priority to German Patent Application Ser. No. DE 10 2023 101 145.6 filed Jan. 18, 2023, which is incorporated herein by reference.

BACKGROUND OF THE DISCLOSURE

Field of the Disclosure

The disclosure relates to a concave of a cone crusher and/or gyratory crusher for installation inside a crusher head, wherein the concave has a central longitudinal axis extending in the longitudinal direction, wherein the concave has a feed for material to be crushed on its top and a crushed material discharge area at its opposite bottom, and wherein the concave has a base part having an outer clamping surface.

Description of the Prior Art

Cone crushers or gyratory crushers are used to crush mineral materials. They have a rotating and/or tumbling crushing body, which is disposed inside the concave. The outer crushing surface of the crushing body faces the inner crushing surface of the concave. During crushing operation, the mineral material filled into the crusher head is crushed between the mantle surface and the concave surface. The outer clamping surface of the concave is held on a crusher head. If the concave needs to be replaced, for instance due to wear, the concave can be detached from the crusher head.

EP 2 758 176 (U.S. Pat. No. 9,566,585) describes a concave that is connected to the crusher head via a clamped connection having a segmented clamping ring. It is difficult to install this clamped connection, which also requires a large number of parts.

From EP 3 317 018 B1 (U.S. Pat. No. 10,391,500) a concave that is inserted into a crusher head is known. The upper rim of the concave has protrusions that project radially outwards. The protrusions have bolt mounts through which the fastening screws are inserted and screwed into threaded sockets in the crusher head. The threaded connection is susceptible to damage, i.e., a secure fastening of the concave cannot always be guaranteed.

SUMMARY OF THE DISCLOSURE

The disclosure addresses the problem of creating a concave or a crusher assembly having such a concave for a cone crusher or gyratory crusher, which concave requires as few and simple components as possible and which concave permits simple installation and removal while being securely fastened at the same time.

The problem relating to the concave is solved in that the base part has a support section having fastening lugs projecting radially outwards, wherein the fastening lugs are disposed spaced apart from one another in the circumferential direction of the support section by means of spacer areas, wherein at least one clearance is provided in each of the spacer areas, which clearances permit a penetration in the direction of the central longitudinal axis from the bottom in the direction of the top and wherein the radially outward extent of the clamping surface is greater, at least sectionally, than the radially outward extent of the fastening lugs.

The problem relating to the crusher assembly is solved in that the concave is mounted inside the crusher head, wherein the crusher head has a bearing part, which has a counter-surface facing the space encompassed by the crusher head and against which counter-surface the clamping surface of the concave bears, in that the crusher head forms supports, which face the fastening lugs and which are disposed at a distance from one another in the circumferential direction, forming spacer areas, wherein passages are formed in these spacer areas, and in that the fastening lugs are clamped to the supports by means of the clamping elements.

The crusher head can be moved towards the concave to install the concave. Supports of the crusher head can be guided through the openings of the concave. The crusher head can then be rotated relative to the concave until the supports are opposite from the fastening lugs of the concave. Finally, the concave can be clamped to the crusher head using suitable clamping elements in such a way that the clamping surface of the concave is pulled against a mating surface of the crusher head. The clamping elements shall be disengaged for removal. The crusher head can then be rotated around the central longitudinal axis relative to the concave until the supports reach the area of clearance between the fastening lugs. Finally, the crusher head can simply be lifted off the concave.

This type of installation/removal is advantageously easy and simple clamping elements can be used.

For load-optimized transfer of force, provision may be made for the projection of the clamping surface in the direction of the central longitudinal axis into a plane to jut out beyond the projection of the fastening lugs in the direction of the central longitudinal axis into this plane, at least sectionally.

According to the disclosure, provision may be made for the base part to have a circumferential inner crushing surface, at least sectionally, which tapers in the direction of the central longitudinal axis from the bottom to the top, at least sectionally. This design is particularly suitable for use in a cone crusher. For optimized crushing performance, provision may be made for a crushing surface extension to adjoin the crushing surface towards the top via a stepped transition.

If provision is made for the radially outward extent of the inner crushing surface to be at least sectionally greater than the radially outward extent of the fastening lugs, and/or for the projection of the inner crushing surface in the direction of the central longitudinal axis into a plane to at least sectionally jut out beyond the projection of the fastening lugs in the direction of the central longitudinal axis into this plane, then this results in an optimized transfer of force from the concave into the crusher head.

According to the disclosure, provision may also be made for at least one, preferably all, fastening lugs to have a clamping element mount, on which a clamping element is held or which is designed to hold a clamping element, and for the clamping element mount to have an aperture for the passage of a clamping screw of the clamping element, wherein preferably provision is made for the aperture to open radially outwards by means of a passage in order to move the clamping screw through the passage into or out of the aperture. The clamping screw can be used to brace the fastening lug against the matching support of the crusher head. In this way, the clamping surface of the concave is then pulled against an opposite counter surface of the crusher head. Then the concave is securely attached to the crusher head. If the aperture is open to the outside via a passage, the clamping screw can simply be inserted laterally into the aperture, which is easy to do even under difficult installation conditions.

For an ideal transfer of the clamping forces from the crusher head into the concave, provision may be made for at least one of the fastening lugs to form a mount for a nut on its end facing the bottom, wherein the mount has a pressure surface directed towards the bottom to support the nut.

To simplify installation, provision may also be for an anti-rotation device to be present in the area of the mount, which anti-rotation device holds the nut on the mount in a rotationally secured manner in the circumferential direction. The clamping screw can then be tightened without using an additional tool to hold the nut.

It is also conceivable that the holder has a blocking piece that blocks radial displacement of the nut held in the mount. If the clamping screw is loosened, it is still held captive on the fastening lug, as the nut prevents the clamping screw from being displaced on the blocking piece. This ensures in particular that the clamping elements are not lost during the installation/removal process, in particular if they fall into an area of the crusher that is difficult to access when they are loosened.

According to the disclosure, provision may be made for the clamping element to have a pressure piece, and for the pressure piece, to perform a translatory motion or a combined translatory and rotatory motion when the clamping element is moved from an initial position to a clamping position.

If the pressure piece performs a combined rotational and translatory motion, in the simplest case the clamping element can be a clamping screw, the free end of which forms the pressure piece.

A purely translatory motion has the advantage that the pressure piece is not twisted in relation to a support of the crusher head, minimizing the risk of damage to the surface on which the pressure piece rests.

According to a possible variant of the disclosure, provision may be made for the clamping element to have two spaced-apart pressure pieces, which are interconnected via a connection section, for the connection section to have a screw mount, which is aligned with a screw mount of the fastening lug disposed in the area between the pressure pieces, and for a screw element to be passed through the aligned screw mounts and screwed into the nut held below the fastening lug. When the screw element is tightened, the fastening lug is moved relative to the connection section between the two pressure pieces. In this way, the pressure pieces can be pressed against the assigned supports of the crusher head and the latter can be moved in relation to the concave. The use of two pressure pieces reduces the surface pressure. The clamping element can be designed as a simple component. For instance, the two pressure pieces can be manufactured in conjunction with the connection section as a U-shaped component, for instance as a stamped and bent part, from a sheet metal blank If the nut is also held in the area between the pressure pieces, it is secured there against rotation.

A crusher assembly according to the disclosure can be such that the crusher head has a circumferential inner wall, which forms a feed opening, that the bearing part protrudes from the inner wall in the direction of the concave, and that the support is disposed at a distance from the inner wall inside the crusher head.

One conceivable variant of the disclosure can be such that a stop connection is effective between the concave and the crusher head, which stop connection prevents the crusher head from rotating relative to the concave in the installation position in the circumferential direction at least in one direction. In this way, a defined allocation of these components is guaranteed in the installation position, preventing incorrect installation. For instance, provision may be made for a stop on one or more of the fastening lugs of the concave, which stop interacts with a counter-stop on the crusher head.

BRIEF DESCRIPTION OF THE DRAWINGS

The disclosure is explained in greater detail below based on exemplary embodiments shown in the drawings. In the figures.

DETAILED DESCRIPTION

Figure 1:
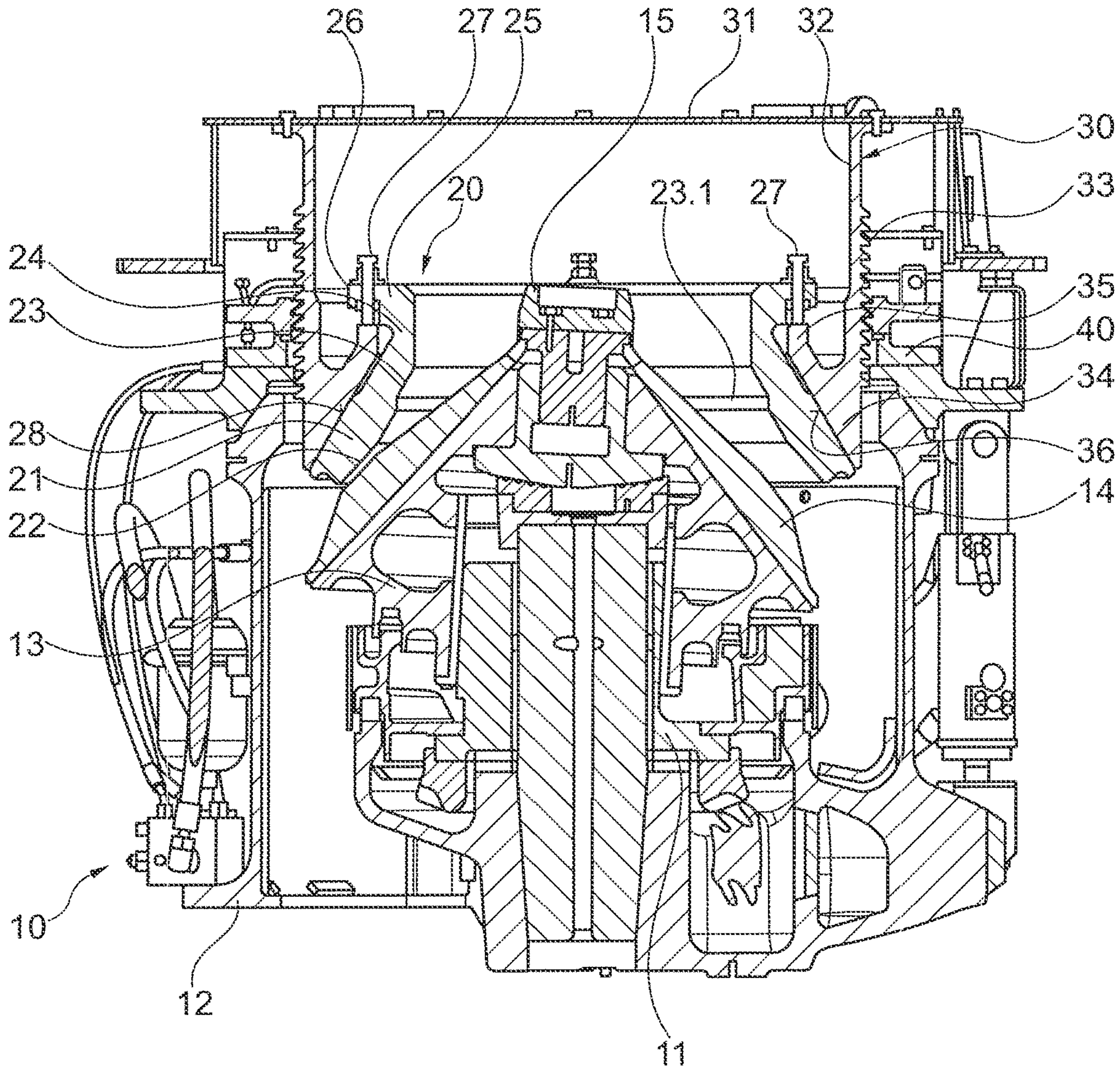
FIG. 1 shows a side view and a section of the crusher unit.

FIG. 1 shows a crusher unit 10 as used in a cone crusher, or also in a gyratory crusher, according to the disclosure.

The crusher unit 10 has a housing 12, in which a drive 11 is mounted. The drive 11 drives a support unit 13, which holds a mantle 14. The mantle 14 is held on the support unit 13 via a holding device 15 in an exchangeable manner.

The mantle 14 is disposed in such a way that it is guided on an orbital path inside the concave 20 during operation. An outer crushing surface of the mantle and an inner crushing surface 22 of the concave 20 face each other, forming a crushing gap. Due to the motion of the mantle 14 on the orbital path, the crushing gap moves in the circumferential direction during the wobbling motion of the mantle 14.

In conjunction with a crusher head 30, the concave 20 forms an assembly that is placed on top of the crusher unit 10. The concave 20 is firmly connected to the crusher head 30.

The crusher head 30 has a male thread 33 on its outer surface, which male thread interacts with a crushing gap adjuster 40. Similar to a nut, the crusher gap adjuster 40 can be rotated to adjust the crusher head 30 in FIG. 1 vertically upwards or downwards via the threaded connection. In this way, the distance between the concave 20 and the mantle 14, i.e., the crushing gap can be set.

Figure 2:
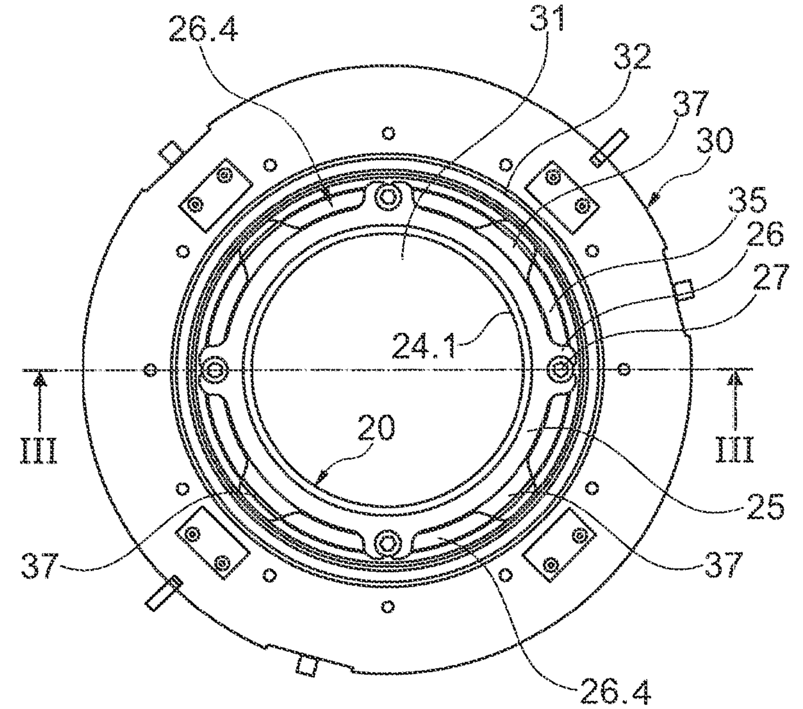
FIG. 2 shows a top view of the assembly of the crusher unit of FIG. 1.
Figure 3:
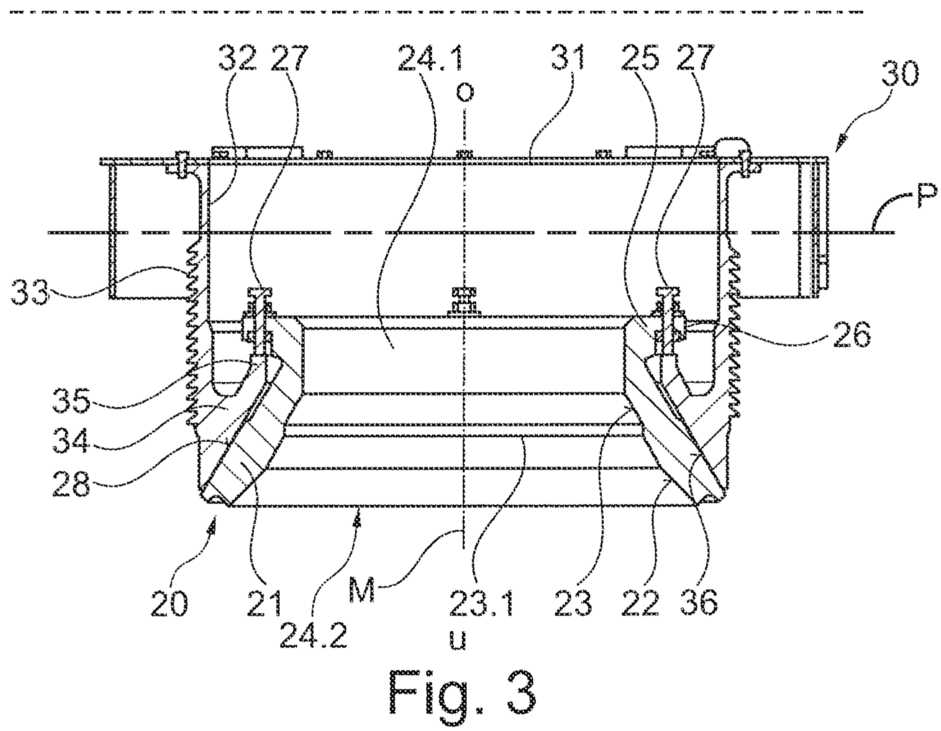
FIG. 3 shows the assembly of FIG. 2 along the course of the section line marked III-III in FIG. 2.

FIGS. 2 and 3 show the assembly consisting of the concave 20 and the crusher head 30. As these drawings show, the concave 20 has a base part 21, which forms the crushing surface 22. The crushing surface 22 tapers from bottom to top in the direction of the central longitudinal axis M of the assembly. Preferably, the crushing surface 22 can taper continuously or discontinuously. In this exemplary embodiment, it is shown that a step may be present in the crushing surface 22, such that a jump in continuity results in the contour of the crushing surface 22 in cross-section, as FIG. 3 shows. Furthermore, a crushing surface extension 23 may adjoin the crushing surface 22, which crushing surface extension merges into the crushing surface 22 via a stepped transition 23.1.

FIG. 1 shows that a crushing gap is formed via the discontinuity or the stepped transition and/or the crushing surface extension 23, which crushing gap widens upwards and facilitates the intake of the material to be crushed into the crushing gap.

As FIG. 3 shows, the concave 20 can have a feed 24.1 for material to be crushed at its upper end (top O). The feed 24.1 for material to be crushed may be formed by a cylindrical extension, which may be integrally formed on the base part 21.

At its lower end (bottom U), the concave 20 forms a crushed material discharge area 24.2. The material to be crushed can reach the area of the crushing surface 22 via the feed 24.1 for material to be crushed. The crushed material leaves the crusher unit 10 via the crushed material discharge area 24.2.

FIG. 3 further illustrates that the base part 21 has a support section 25, preferably in the area of the feed 24.1 for material to be crushed. The support section 25 can form the upper rim of the concave 20. The support section 25 has several fastening lugs 26. In this exemplary embodiment, four fastening lugs 26 are used. Preferably, the fastening lugs 26 are evenly distributed along the circumference. In the area between the fastening lugs 26, spacer areas are formed in the circumferential direction, wherein passages 26.4 are provided in the spacer areas. The passages 26.4 permit a penetration in the direction of the central longitudinal axis M.

FIG. 2 illustrates that the fastening lugs 26 can be penetrated by apertures, for instance screw mounts. The screw mounts open radially outwards by means of passages 26.1, as shown for instance in FIGS. 4 and 5.

Figure 4:
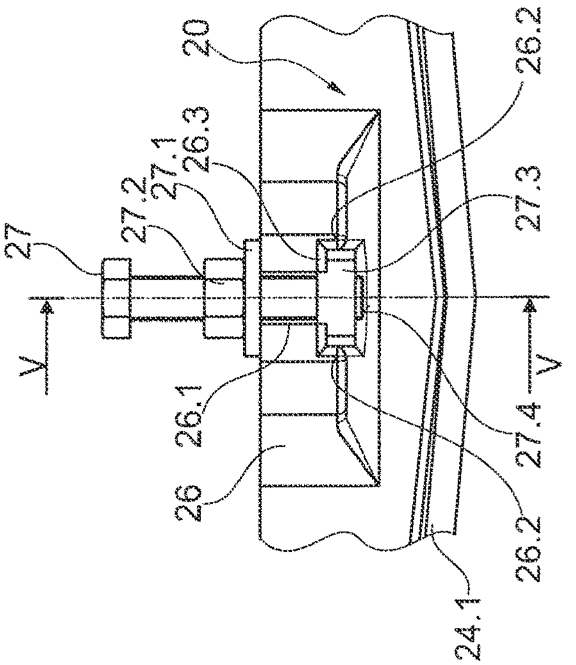
FIG. 4 shows a detail of the assembly of FIGS. 2 and 3.
Figure 5:
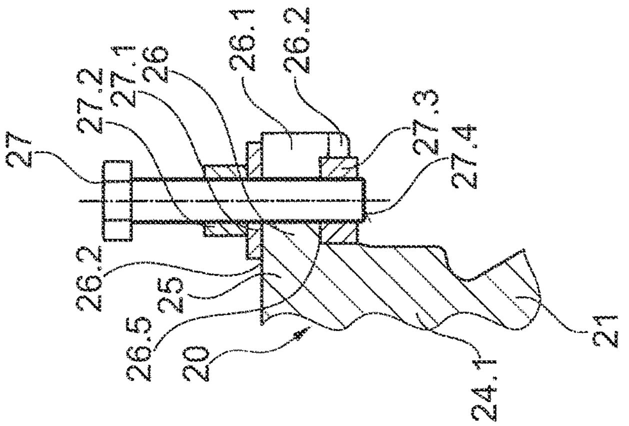
FIG. 5 shows the detail of FIG. 4 along the course of the section line marked V-V in FIG. 4.
Figure 6:
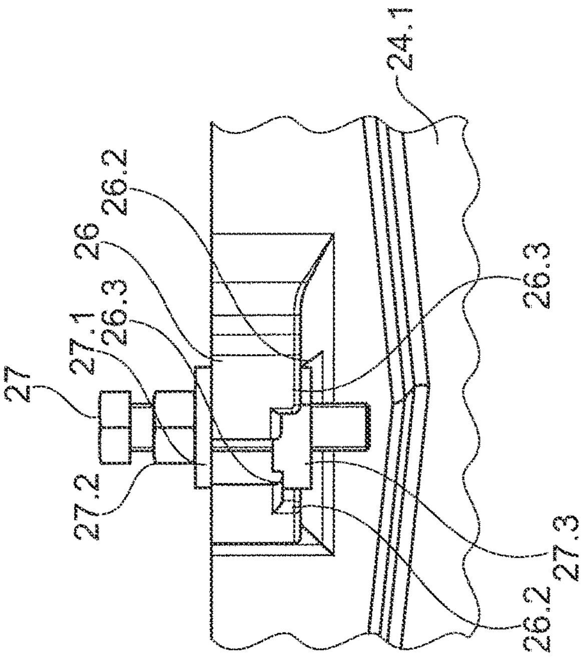
FIG. 6 shows a perspective representation of the detail of FIG. 4.

FIGS. 4 to 6 further illustrate that a clamping element 27, which can be designed as a screw, penetrates the aperture of the fastening lug 26. The passage 26.1 is dimensioned such that the shaft of the screw can be inserted laterally through the passage 26.1 and pushed into the aperture.

A nut 27.3 is screwed onto the clamping element 27. The nut 27.3 is held in a mount on the bottom of the fastening lug 26 and its bottom rests on a pressure surface 26.5 of the mount. The free end of the clamping element 27 forms a pressure piece 27.4.

A locking part 27.2, for instance in the form of a lock nut, can be screwed onto the clamping element 27 in the area between the head of the clamping element 27 and the fastening lug 26. A washer 27.1 can be disposed between the locking part 27.2 and the fastening lug 26.

As FIG. 3 illustrates, the crusher head 30 has supports 35, which face the pressure pieces 27.4 of the clamping elements 27. The pressure pieces 27.4 rest on the upper surfaces of the supports 35.

The crusher head 30 has a circumferential inner wall 32, which encompasses a feed opening 31 in the area of the top O. The material to be crushed can be filled into the crusher head 30 via the feed opening 31.

As FIG. 3 illustrates, the inner wall 32 can bear the male thread 33 for the crushing gap adjuster 40 on its outside, as mentioned above. The male thread 33 may have a buttress thread design, wherein the buttress thread design has surface sections extending radially from the central longitudinal axis. These surface sections are used to improve the transfer of force to suitably disposed surface sections of the crushing gap adjuster 40.

The inner wall 32 bears, preferably at its lower end area, a bearing part 34, which is of circumferential design. The supports 35 are integrally formed on the bearing part 34.

In the circumferential direction, the supports 35 are disposed at a distance from one another, forming axial passages 37. The dimensions of the passages 37 are designed to axially guide the fastening lugs 26 through the passages 37. Furthermore, the passages 26.4 between the fastening lugs 26 are dimensioned in the circumferential direction in such a way that the supports 35 can be guided through the passages 26.4 in the axial direction.

FIG. 3 further illustrates that the bearing part 34 has an inwardly directed, circumferential mating surface 36, which, in the assembled state of the concave 20, bears against an outer, preferably circumferential, clamping surface 28 of the concave 20.

The clamping surface 28 is preferably designed to taper conically, wherein the clamping surface 28 tapers from the bottom U to the top O. The mating surface 36 is tapered in a matching manner. Preferably, as FIG. 3 shows, the projection of the clamping surface 28 parallel to the central longitudinal axis M onto an imaginary plane P perpendicular to the central longitudinal axis M, projects radially outwards, at least sectionally, onto this plane P beyond the projection of the fastening lugs 26.

According to an advantageous embodiment, the pressure surfaces of the supports 35, on which the pressure pieces 27.4 of the clamping elements 27 rest, are at least partially, but preferably completely, offset radially inwards in relation to the clamping surface 28. This is clearly shown in FIG. 3. In this way an optimized transfer of the clamping forces from the clamping elements 27 to the crusher head 30 is ensured.

If the concave 20 is to be replaced, for instance because it has reached its wear limit, the assembly consisting of the crusher head 30 and the concave 20 is lifted off the crusher unit 10, for instance using a hoist. The assembly 10 can then be placed to the side next to the crusher unit. The clamping elements 27 are then easily accessible and can be disengaged. In this way, the clamping connection formed between the clamping surface 28 and the mating surface 36 is disengaged. The crusher head 30 can then be rotated in the circumferential direction relative to the concave 20 until the supports 35 face the passages 26.4 of the concave. In this state, the fastening lugs 26 are also opposite the passages 37. The crusher head 30 can now be lifted off in the direction of the central longitudinal axis M, wherein the fastening lugs 26 pass through the passages 37 and the supports 35 pass through the passages 26.4. The concave 20 is now separated from the crusher head 30. A new concave 20 can now be connected to the crusher head 30 in reverse order. Finally, the clamping elements 27 are braced, wherein the pressure pieces 27.4 are braced against the supports 35. This re-establishes the clamping connection between the clamping surface 28 of the concave 20 and the associated mating surface 36 of the crusher head 30. The assembly installed in this way can then be reinserted into the crusher unit 10.

To simplify removal, the assignment of the clamping elements 27 to the fastening lugs 26 can be designed as shown in FIGS. 4 to 6. As these illustrations show, anti-rotation devices 26.2 may be provided in the area of the fastening lugs 26, which anti-rotation devices secure the nut 27.3 against rotation in the circumferential direction. Preferably, the anti-rotation devices 26.2 are designed as integrally formed protrusions on the fastening lugs 26.

Additionally or alternatively, as FIG. 6 shows, a blocking piece 26.3 can be provided in the area of the mount of the fastening lug 26. The blocking piece 26.3 blocks displacement of the nut 27.3 in the radial direction, such that the clamping element 27 can only be pushed through the passage 26.1 when the nut 27.3 has been sufficiently loosened.

Figure 9:
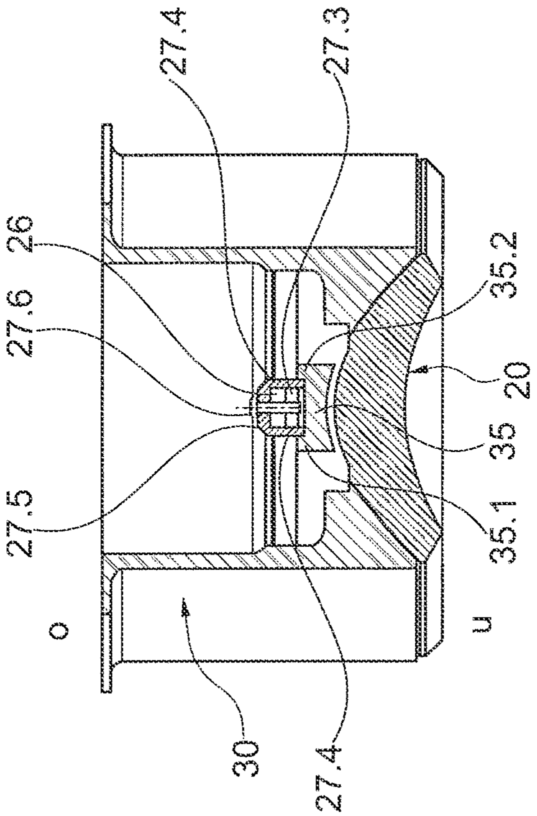
FIG. 9 shows a sectional view along the section marked VII-VII in FIG. 8.
Figure 8:
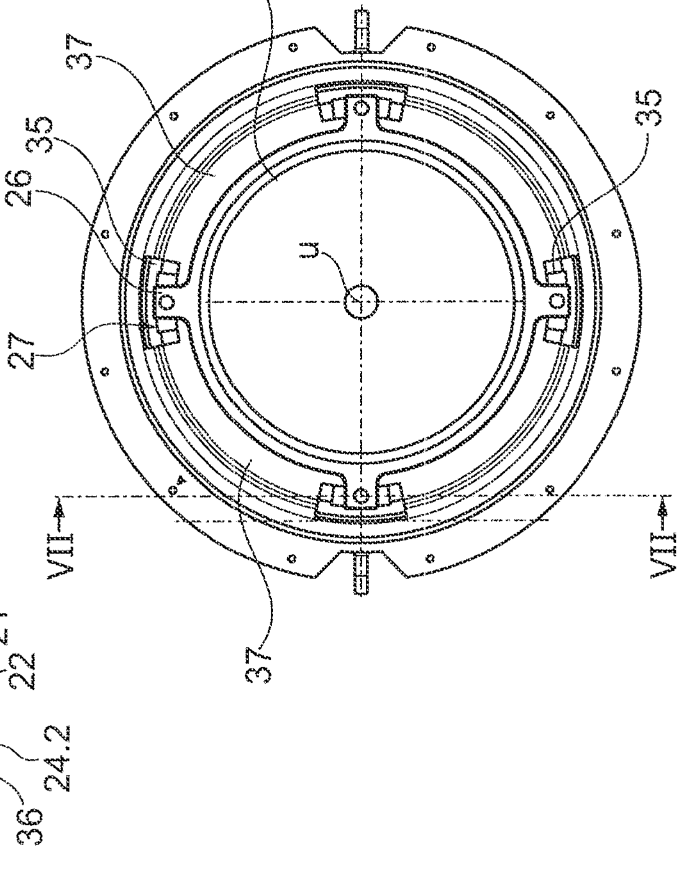
FIG. 8 shows a top view of the assembly of FIG. 7.
Figure 7:
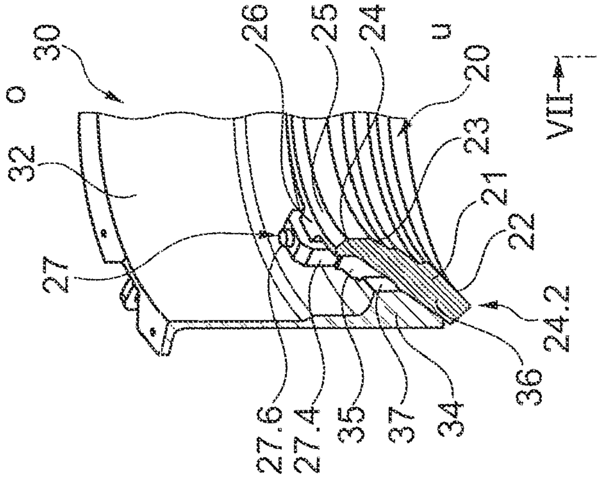
FIG. 7 shows a detailed perspective representation of a modification of the assembly of FIGS. 2 to 6.

FIGS. 7 to 9 show an alternative design variant of a clamping device 27. In all other respects, the exemplary embodiment shown in FIGS. 7 to 9 corresponds to the exemplary embodiment shown in FIGS. 1 to 6. Thus, reference can be made to the above statements to avoid repetitions.

As the drawings show, the clamping element 27 has two spaced-apart pressure pieces 27.4, which are integrally formed on a connection section 27.5 in a shanked manner. The connection section 27.5 has a screw mount aligned with the screw mount of the fastening lug 26. The two pressure pieces 27.4 case the fastening lug 26 on both ends in the circumferential direction. The connection section 27.5 rests on the top of the fastening lug 26.

The nut 27.3 is held beneath the fastening lug 26. A screw element 27.6 is passed through the aligned screw mounts of the connection section 27.5 and the fastening lug 26 and screwed into the nut 27.3. When the screw element 27.6 is tightened, the free ends of the pressure pieces 27.4 are moved relative to the fastening lug 26 and thus moved relative to the support 35. In this way, the clamping surface 28 of the concave 20 is pulled against the mating surface 36 of the crusher head 30.

Figure 10:
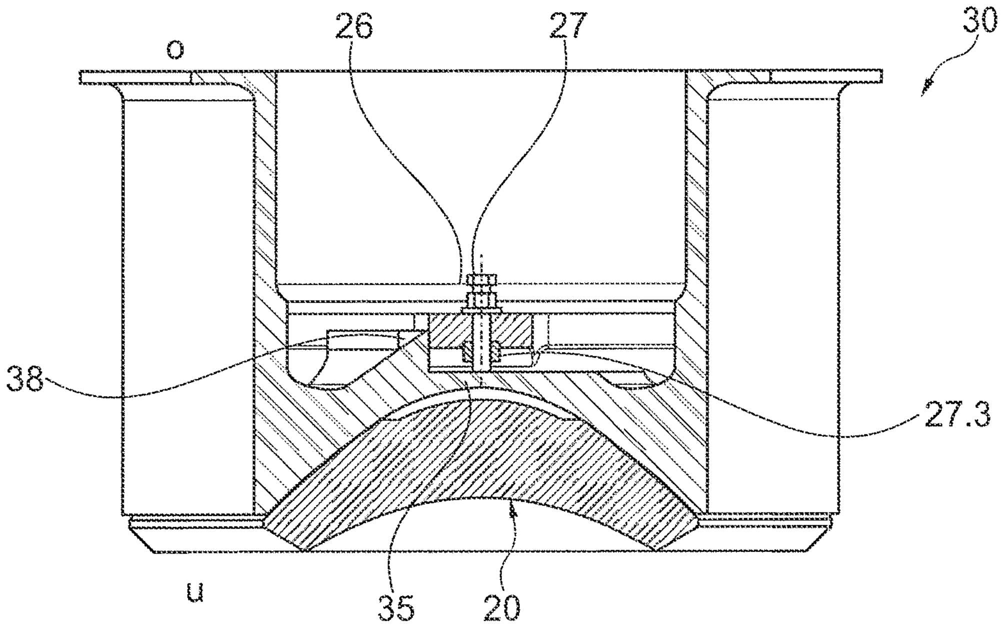
FIG. 10 shows an embodiment alternative to the variant of the embodiment of FIGS. 1 to 6 along the section line marked X-X in FIG. 11
Figure 11:
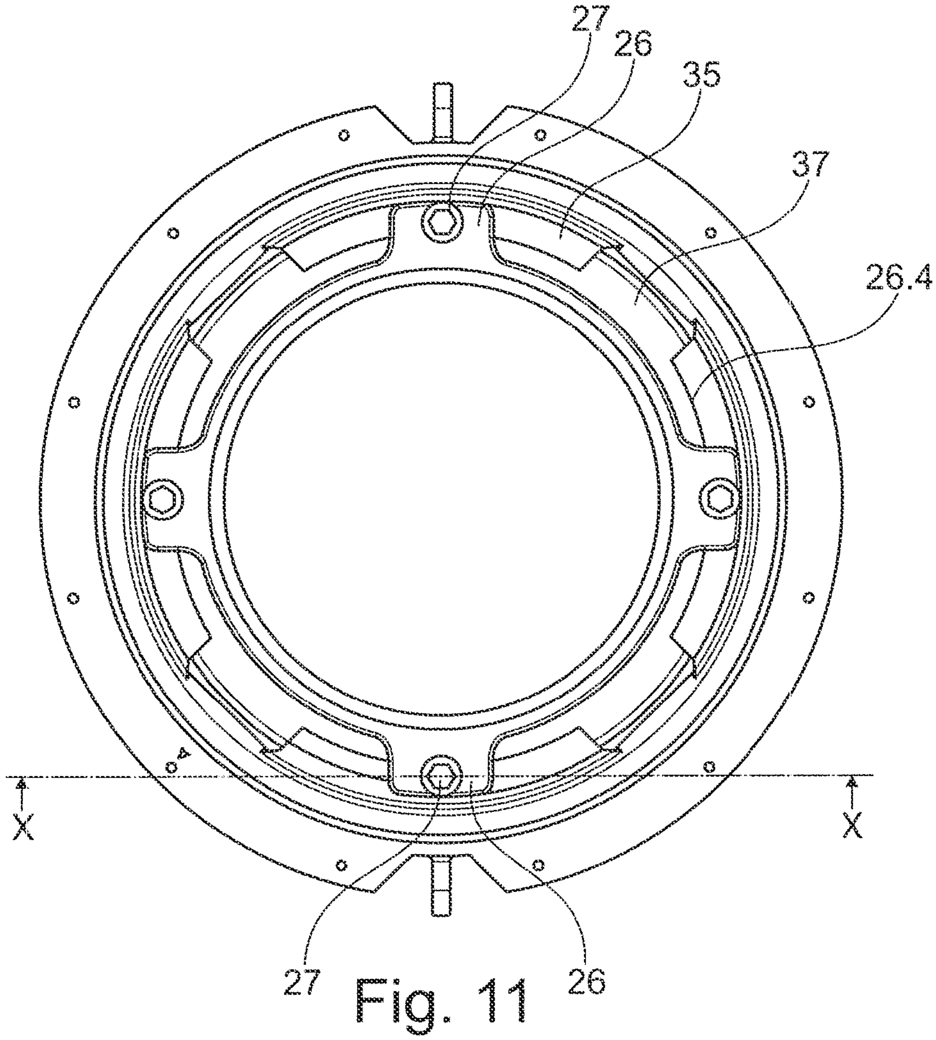
FIG. 11 shows a top view of the assembly of FIG. 10.

FIGS. 10 and 11 show a design variant of a crusher assembly alternative to FIGS. 1 to 6. To avoid repetition, reference can be made to the above explanations of FIGS. 1 to 6 and only the differences are discussed below.

As shown in FIGS. 10 and 11, a stop connection is effective between the concave 20 and the crusher head 30, which stop connection prevents the crusher head 30 from rotating circumferentially in one direction relative to the concave 20 in the installation position. In this way, a defined allocation of these components is guaranteed in the installation position, preventing incorrect installation. To this end, for instance, provision may be made for a stop to be provided on one or more of the fastening lugs 26 of the concave 20, which stop interacts with a counter-stop 38 on the crusher head 30.

The invention claimed is:

1. A device for installation inside a crusher head of a cone crusher and/or gyratory crusher, the device comprising:
- a concave including:
- a base part having a central longitudinal axis extending in a longitudinal direction of the concave, the base part having a feed opening at a top of the base part and a crushed material discharge opening at a bottom of the base part, the base part further including:
- a support section defined on the base part and including a plurality of fastening lugs extending radially outward relative to the central longitudinal axis, the fastening lugs being spaced apart from one another in a circumferential direction by spacer areas, each of the spacer areas including at least one clearance extending parallel to the central longitudinal axis; and
- an outer clamping surface defined on the base part below the support section, the outer clamping surface extending radially outward greater than a radially outward extent of the fastening lugs, at least in portions of the outer clamping surface; and
- a clamping element including a nut;
- wherein at least one of the fastening lugs includes a clamping element mount configured to hold the clamping element, the clamping element mount including a pressure surface facing downward towards the bottom of the base part, the pressure surface being configured to support the nut; and
- wherein the at least one of the fastening lugs includes an anti-rotation device adjacent the mount and configured to hold the nut on the mount in a rotationally secured manner.

2. The device of claim 1, wherein:
- a projection of the clamping surface parallel to the central longitudinal axis onto an imaginary plane perpendicular to the central longitudinal axis extends radially outward beyond a projection of the fastening lugs parallel to the central longitudinal axis onto the imaginary plane, at least in portions of the outer clamping surface.

3. The device of claim 1, wherein:
- the base part includes a circumferential inner crushing surface which at least in part tapers in a direction from the bottom towards the top of the base part.

4. The device of claim 3, wherein:
- the base part further includes a crushing surface extension adjoining the circumferential inner crushing surface by a stepped transition and extending upwards towards the top of the base part.

5. The device of claim 3, wherein:
- the circumferential inner crushing surface extends radially outward greater than a radially outward extent of the fastening lugs, at least in portions of the circumferential inner crushing surface.

6. The device of claim 1, wherein:
- the clamping element includes a clamping screw; and
- the clamping element mount includes an aperture for the receipt of the clamping screw of the clamping element, and a radially extending passage communicated with the aperture, the radially extending passage being configured to allow the clamping screw to move through the passage into or out of the aperture.

7. The device of claim 1, wherein:
- the clamping element includes a pressure piece and the clamping element is configured such that the pressure piece performs a translatory motion or a combined translatory and rotary motion when the clamping element is moved from an initial position into a clamping position.

8. The device of claim 1 in combination with the crusher head, wherein:
- the crusher head includes a bearing part including a counter-surface facing a space encompassed by the crusher head, the clamping surface of the concave bearing against the counter-surface of the crusher head;
- the crusher head includes a plurality of supports facing the fastening lugs of the concave, the supports being spaced apart from one another in a circumferential direction by crusher head spacer areas; and
- further comprising a plurality of the clamping elements clamping the fastening lugs of the concave to the supports of the crusher head.

9. The device of claim 8, wherein:
- the crusher head includes a circumferential inner wall forming a feed opening for receiving material to be crushed;
- the bearing part of the crusher head protrudes from the inner wall toward the concave; and the supports are disposed at a distance from the inner wall inside the crusher head.

10. The device of claim 8, wherein:

the crusher head includes a male thread on an outer surface of the crusher head, the male thread extending at least in part around the central longitudinal axis.

11. The device of claim 8, further comprising:

a stop connection between the concave and the crusher head, the stop connection being configured to prevent rotation of the crusher head relative to the concave in at least one circumferential direction about the central longitudinal axis.

12. A device for installation inside a crusher head of a cone crusher and/or gyratory crusher, the device comprising:

a concave including:

a base part having a central longitudinal axis extending in a longitudinal direction of the concave, the base part having a feed opening at a top of the base part and a crushed material discharge opening at a bottom of the base part, the base part further including:

a support section defined on the base part and including a plurality of fastening lugs extending radially outward relative to the central longitudinal axis, the fastening lugs being spaced apart from one another in a circumferential direction by spacer areas, each of the spacer areas including at least one clearance extending parallel to the central longitudinal axis; and an outer clamping surface defined on the base part below the support section, the outer clamping surface extending radially outward greater than a radially outward extent of the fastening lugs, at least in portions of the outer clamping surface; and a clamping element including a nut;

wherein at least one of the fastening lugs includes a clamping element mount configured to hold the clamping element, the clamping element mount including a pressure surface facing downward towards the bottom of the base part, the pressure surface being configured to support the nut; and wherein the mount includes a blocking piece configured to block radial displacement of the nut held in the mount.

13. A device for installation inside a crusher head of a cone crusher and/or gyratory crusher, the device comprising:

a concave including:

a base part having a central longitudinal axis extending in a longitudinal direction of the concave, the base part having a feed opening at a top of the base part and a crushed material discharge opening at a bottom of the base part, the base part further including:

a support section defined on the base part and including a plurality of fastening lugs extending radially outward relative to the central longitudinal axis, the fastening lugs being spaced apart from one another in a circumferential direction by spacer areas, each of the spacer areas including at least one clearance extending parallel to the central longitudinal axis; and an outer clamping surface defined on the base part below the support section, the outer clamping surface extending radially outward greater than a radially outward extent of the fastening lugs, at least in portions of the outer clamping surface; and a clamping element:

wherein at least one of the fastening lugs includes a first screw mount;

wherein the clamping element includes a connection section, a screw element and a nut;

wherein the connection section includes two spaced apart pressure pieces and a second screw mount aligned with the first screw mount;

wherein the nut is held below the at least one of the fastening lugs; and wherein the screw element is passed through the aligned first and second screw mounts and is screwed into the nut.

* * * * *